(12) United States Patent
Grundner

(10) Patent No.: US 6,680,024 B1
(45) Date of Patent: Jan. 20, 2004

(54) METHOD FOR PRODUCING A COUPLING BODY BY POWDER-METALLURGY

(75) Inventor: Alois Grundner, Eberstalzell (AT)

(73) Assignee: Miba Sintermetall Aktiengesellschaft, Laakirchen (AT)

( * ) Notice: Subject to any disclaimer, the term of this patent is extended or adjusted under 35 U.S.C. 154(b) by 0 days.

(21) Appl. No.: 10/031,847

(22) PCT Filed: Jul. 18, 2000

(86) PCT No.: PCT/AT00/00199

§ 371 (c)(1),
(2), (4) Date: Jan. 23, 2002

(87) PCT Pub. No.: WO01/08838

PCT Pub. Date: Feb. 8, 2001

(30) Foreign Application Priority Data

Jul. 29, 1999 (AT) .............................. 1311/99

(51) Int. Cl.⁷ .................................. B22F 3/12
(52) U.S. Cl. ...................................... 419/38
(58) Field of Search ........................... 419/38

(56) References Cited

U.S. PATENT DOCUMENTS 5,524,738 A * 6/1996 Erlebach et al. ......... 192/69.83

* cited by examiner

Primary Examiner—Daniel J. Jenkins
(74) Attorney, Agent, or Firm—Collard & Roe, P.C.

(57) ABSTRACT

A process for powder metallurgic manufacture of a coupling body (1) with a crown (2) of coupling teeth (3) is described, whose flanks (5) going out from wedge-shaped end faces (4) are in relief, such that a formed body with coupling teeth (3), which have wedge-shaped end faces (4), but flanks (5) parallel to axis, is pressed out of a sintering powder and sintered to a molded blank, whose coupling teeth (3) for forming the flank reliefs are subjected to axial compression molding between two form tools (9, 10) on the one hand for the wedge-shaped end faces (4) and on the other hand for the flank reliefs. To create advantageous processing conditions it is suggested that during compression molding of the flank reliefs in the transition region between the flanks (5) and the wedge-shaped end faces (4) a flank-side interlocking shoulder (7), with a rounded transition (8) to the wedge-shaped end faces (4) and lying in the mold surface (11) of the form tools (9, 10), is pressed into the flanks (5) of the coupling teeth (3).

2 Claims, 2 Drawing Sheets

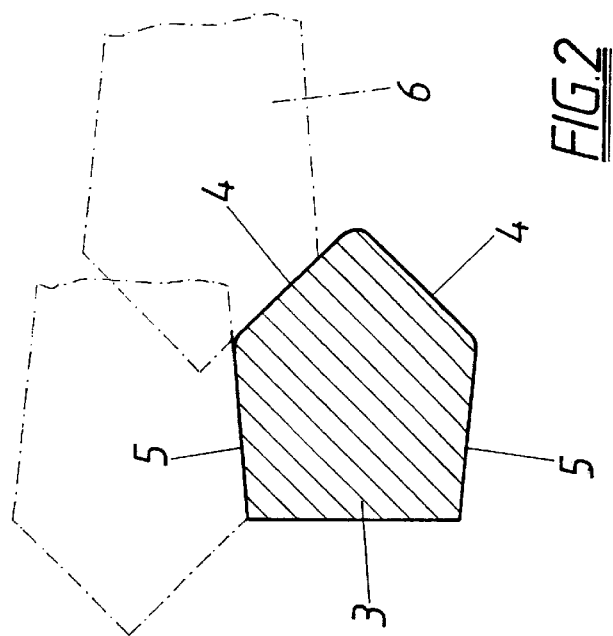
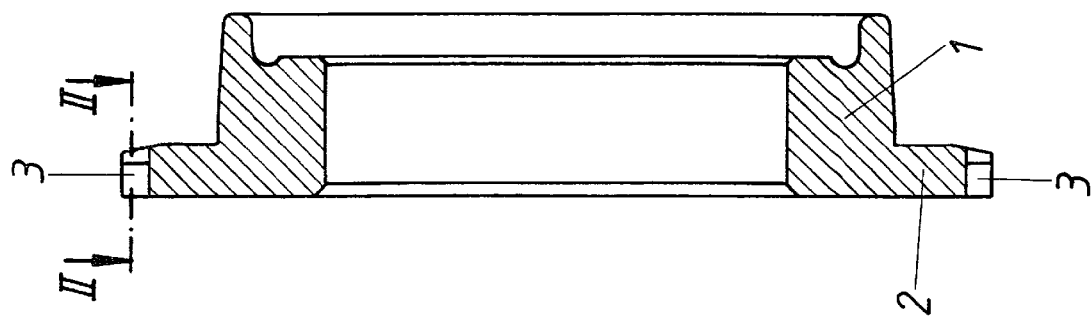

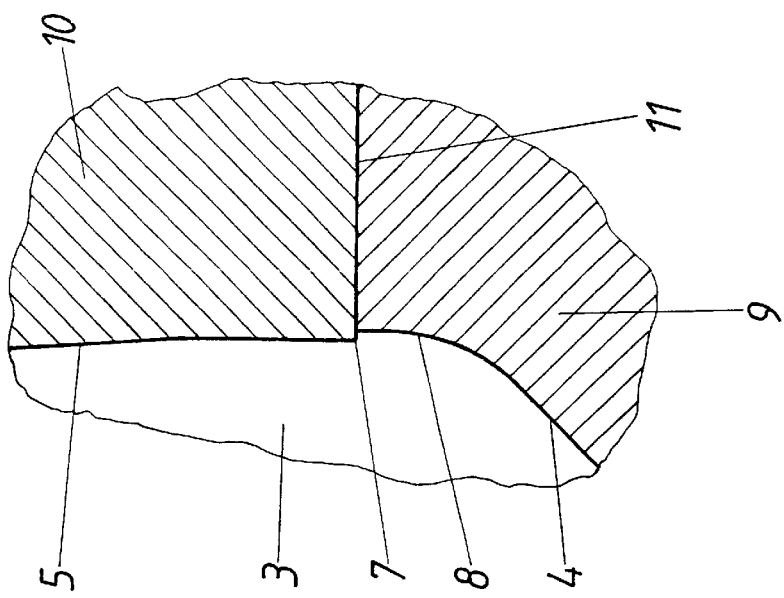
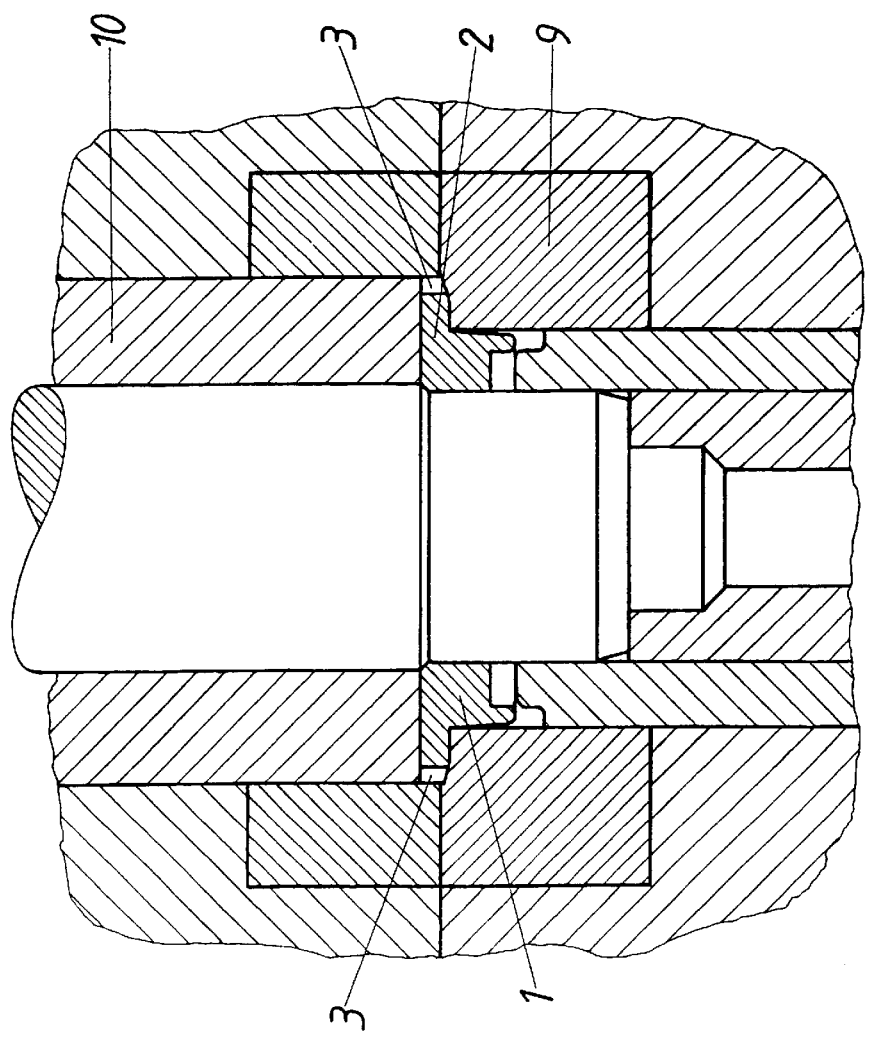

METHOD FOR PRODUCING A COUPLING BODY BY POWDER-METALLURGY

CROSS REFERENCE TO RELATED APPLICATIONS

Applicant claims priority under 35 U.S.C. §119 of Austrian Application No. A 1311/99 filed Jul. 29, 1999. Applicant also claims priority under 35 U.S.C. §365 of PCT/AT00/00199 filed Jul. 18, 2000. The international application under PCT article 21(2) was not published in English.

BACKGROUND OF THE INVENTION

1. Field of the Invention

The present invention relates to a process for powder metallurgic manufacture of a coupling body having a crown of coupling teeth, whose flanks coming out from wedge-shaped end faces are in relief, such that a formed body with coupling teeth, which have wedge-shaped end faces, but axis-parallel flanks, is pressed out of a sintering powder and is sintered to a molded blank, whose coupling teeth, for forming the flank reliefs are subjected to axial compression-molding between two form tools on the one hand for the wedge-shaped end faces and on the other hand for the flank reliefs.

2. Description of the Prior Art

Coupling bodies for vehicle gearboxes have a crown of coupling teeth which cooperate with the claws of a clutch collar. For this purpose on the side facing the clutch collar the coupling teeth form roof-like, wedge-shaped end faces, which facilitate engagement of the claws of the clutch collar in the tooth crown of the coupling body. The engaged position is ensured by a flank relief of the coupling teeth. To avoid the wedge-shaped end faces and the flank reliefs having to be machined down, it has already been proposed (DE 38 39 800 A1) to manufacture these coupling bodies by powder metallurgy, such that a sintering powder is used to press out a formed body with coupling teeth which have wedge-shaped end faces, but axis-parallel flanks. Following a sintering procedure the molded body is calibrated between two form tools, and with simultaneous formation of the flank reliefs of the coupling teeth. For this purpose, the molded blank is laid in the form tool forming a bottom ram for the wedge-shaped end faces, before the top ram, which exhibits the negative form required for the flank reliefs, is pressed against the bottom ram, such that the flanks of the coupling teeth are in relief by corresponding compression molding. The drawback to this known process however is that the joint face between the form tools causes the danger of a burr-like projection in the transition region between the wedge-shaped end faces and the flank reliefs, so that these coupling bodies must be subjected to subsequent processing to be able to ensure coupling teeth without burr.

The object of the invention therefore is a process for powder metallurgic manufacture of a coupling body with a crown of coupling teeth of the type described at the outset, such that with compression molding the sintered molded blanks for forming the flank reliefs the mechanical molding procedure can be terminated, such that subsequent processing on the form is not required.

The invention solves this task by the fact that with compression molding of the flank reliefs in the transition region between the flanks and the wedge-shaped end faces a flank-side interlocking shoulder with a rounded transition to the wedge-shaped end faces and lying in the molding surface of the form tools is impressed in the flanks of the coupling teeth.

Because a flank-side interlocking shoulder is impressed, no burred heaping up of material hampering the engaging movement of the claws of the clutch collar can occur in the transition region from the wedge-shaped end faces to the flanks, particularly since compression molding provides a rounded transition of the shoulder lying in the molding surface of the form tools to the next wedge-shaped end face, so that a constant transition, advantageous for the switching procedure from the wedge-shaped end faces to the shoulder regions can be ensured. It is essential that the material is prevented from heaping up in this region by impressing the interlocking shoulders, such that the elastic behavior of the material can not be considered, particularly since the interlocking shoulders themselves no longer have any influence on the engagement movement of the claws of the clutch collar in the crown of the coupling teeth.

Since the flank-side impressed shoulders are supposed to avoid material heaping up and protruding into the path of the claws of the clutch collar, the penetration depth of the tool forming the shoulders can be comparatively slight. However, there needs to be an adequate heel there to also ensure the desired effect under series manufacturing conditions. For this reason it is recommended to impress the shoulders in the transition region between the flanks and the wedge-shaped end faces of the coupling teeth with a minimum height of 0.01 mm, in such a way that sich an advantageous region of up to 0.1 mm results for the shoulder height measurable on the form tools.

BRIEF DESCRIPTION OF THE DRAWING

The inventive object will now be explained in greater detail with reference to the diagram, in which:

FIG. 1 illustrates a coupling body to be manufactured in a simplified axial section by means of the process according to the present invention, FIG. 2 illustrates a section through a coupling tooth according to line II—II of FIG. 1 on an enlarged scale, FIG. 3 illustrates a pressing device for pressing a coupling body according to FIG. 1 in section in a simplified axial section, and FIG. 4 illustrates a coupling tooth in section in the vicinity of the transition from a wedge-shaped end face to the flank inside the closed form tools in a plan view of the top surface on a greatly enlarged scale.

DESCRIPTION OF THE PREFERRED EMBODIMENT

As is apparent from FIGS. 1 and 2 the coupling body 1 to be manufactured has a crown 2 of coupling teeth 3 which on one end face form roof-like, wedge-shaped end faces 4, attached to which are flanks 5 with an embossed flank relief of 4° for example. The wedge-shaped end faces 4 facilitate the coupling procedure by way of a clutch collar, whose claws 6 along these end faces 4 can be pushed into the engaged position, in which the flank reliefs prevent unintentional disengaging of the circuit connection. As can be seen form the claw positions indicated by dashed lines in FIG. 2, a burr or heaping up of material in the transition region between the wedge-shaped end faces 4 and the flanks 5 in relief would hinder the coupling procedure, so that such build-up of burring during manufacture of the coupling body 1 must be prevented if expensive further processing of the coupling tooth crown 2 is not to be considered. For this purpose, according to FIG. 4 a flank-side interlocking shoulder 7, which with a rounded transition 8 offers a constant gradient to the wedge-shaped end faces 4 is impressed in the transition region from the wedge-shaped end faces 4 to the flanks 5.

These shoulders 7 are manufactured together with the flank reliefs by compression molding a sintered molded blank during its calibration, in such a way that due to the elastic material behavior the shoulder impression which can be established on the coupling teeth 3 after manufacture of the coupling body 1 can turn out to be barely visible. The molded blank, which exhibits coupling teeth 3 with flanks parallel to the axis, is placed in a molding device whose bottom ram forms a tool 9 for calibrating the wedge-shaped end faces 4 together with the transition rounding 8 and whose top ram forms a form tool 10 for the flank relief and the interlocking shoulder 7. As is evident from FIG. 4, the flank-side interlocking shoulder 7 lies in the mold surface 11 between the form tools 9 and 10, so that when the flank relief is compression-molded the shoulders 7 are also impressed. With this compression molding of the flank relief the coupling body 1 is simultaneously calibrated inside the swage occurring between both form tools 9 and 10, so that the coupling body 1 displays its final shape after being ejected from the molding device. In order to ensure the required hardness the coupling body 1 can be sintered again or forwarded for heat treatment after being calibrated. For this purpose the coupling body can already be connected to an escape wheel so that it can be subjected to heat treatment jointly with this escape wheel.

What is claimed is:

1. A process for powder metallurgic manufacture of a coupling body with a crown of coupling teeth, whose flanks extending from wedge-shaped end faces are in relief, such that a formed body with coupling teeth, which have wedge-shaped end faces and axis-parallel flanks, is pressed:out of a sintering powder and sintered to a molded blank, whose coupling teeth for forming the flank reliefs are subjected to axial compression molding between two form tools on the one hand for the wedge-shaped end faces and on the other hand for the flank reliefs, characterized in that during the compression molding of the flank reliefs in a transition region between the flanks and the wedge-shaped end faces a flank-side interlocking shoulder, with a rounded transition to the wedge-shaped end faces and lying in the molding surface of the form tools, is impressed into the flanks of the coupling teeth.

2. A process as claimed in claim 1, characterized in that the shoulder in the transition region between the flanks and the wedge-shaped end faces of the coupling teeth is impressed with a minimum height of 0.01 mm.

* * * * *